US010794748B2

(12) United States Patent
Brody et al.

(10) Patent No.: US 10,794,748 B2
(45) Date of Patent: Oct. 6, 2020

(54) FLUID FLOW SENSOR SYSTEM FOR DETECTING FLOW EVENTS IN A TOILET

(71) Applicant: Mobius Labs, Inc., Brentwood, TN (US)

(72) Inventors: Kyle Brody, Brentwood, TN (US); Matthew Cusack, Troy, NY (US); Frank Lipowitz, Rexford, NY (US); Ashwin Gapchup, Arlington, VA (US)

(73) Assignee: Mobius Labs, Inc., Albany, NY (US)

( * ) Notice: Subject to any disclaimer, the term of this patent is extended or adjusted under 35 U.S.C. 154(b) by 394 days.

(21) Appl. No.: 15/417,754

(22) Filed: Jan. 27, 2017

(65) Prior Publication Data

US 2017/0212533 A1 Jul. 27, 2017

Related U.S. Application Data

(60) Provisional application No. 62/287,493, filed on Jan. 27, 2016.

(51) Int. Cl.
*G01F 15/18* (2006.01)
*E03D 11/00* (2006.01)
*G01F 1/05* (2006.01)
*G01F 1/075* (2006.01)
*G01F 1/115* (2006.01)

(52) U.S. Cl.
CPC .............. *G01F 15/18* (2013.01); *E03D 11/00* (2013.01); *G01F 1/05* (2013.01); *G01F 1/075* (2013.01); *G01F 1/115* (2013.01)

(58) Field of Classification Search
CPC ............ G01F 1/05; G01F 1/075; G01F 1/115
See application file for complete search history.

(56) References Cited

U.S. PATENT DOCUMENTS

| 4,916,762 | A | * | 4/1990 | Shaw | E03D 1/36 227/16 |
| 5,419,189 | A | * | 5/1995 | Lew | G01F 1/125 73/195 |
| 6,877,170 | B1 | * | 4/2005 | Quintana | E03D 1/00 4/427 |
| 7,743,436 | B1 | * | 6/2010 | Schuster | E03D 1/32 137/441 |
| 2003/0145371 | A1 | * | 8/2003 | Ghertner | E03D 1/00 4/427 |
| 2004/0199989 | A1 | * | 10/2004 | Trolio | E03D 1/00 4/427 |
| 2007/0125429 | A1 | * | 6/2007 | Kandl | E03D 1/00 137/389 |

(Continued)

*Primary Examiner* — David L Singer
(74) *Attorney, Agent, or Firm* — Hoffman Warnick LLC

(57) ABSTRACT

A water flow sensor and associated distributed water management system that analyzes water flow in toilets to identify leaks or other failures. A water flow sensor is disclosed that includes: a housing that contains a power source and an event processing system; a sensor that provides water flow data to the event processing system, the sensor having an inlet adapted to receive an inflow of water from a fill tube and an outlet that expels an outflow of water; a probe that activates the event processing system in response to a detected water flow event; and a support structure for seating the housing onto an overflow tube, wherein the support structure includes an assembly to receive the outflow of water and redirect the outflow into the overflow tube.

20 Claims, 6 Drawing Sheets

(56) References Cited

U.S. PATENT DOCUMENTS

| | | | |
|---|---|---|---|
| 2008/0141447 A1* | 6/2008 | Bowcutt | E03D 11/00 4/427 |
| 2010/0000013 A1* | 1/2010 | Williams | E03D 1/00 4/314 |
| 2013/0124113 A1* | 5/2013 | van Dal | G06F 19/00 702/45 |
| 2015/0059074 A1* | 3/2015 | Davies | G01F 23/0007 4/314 |
| 2015/0168188 A1* | 6/2015 | Reichart | G01F 1/584 73/861.12 |
| 2016/0097665 A1* | 4/2016 | Becerra | G01M 3/3254 702/45 |
| 2016/0265208 A1* | 9/2016 | Brackett, Sr. | E03D 11/00 |

* cited by examiner

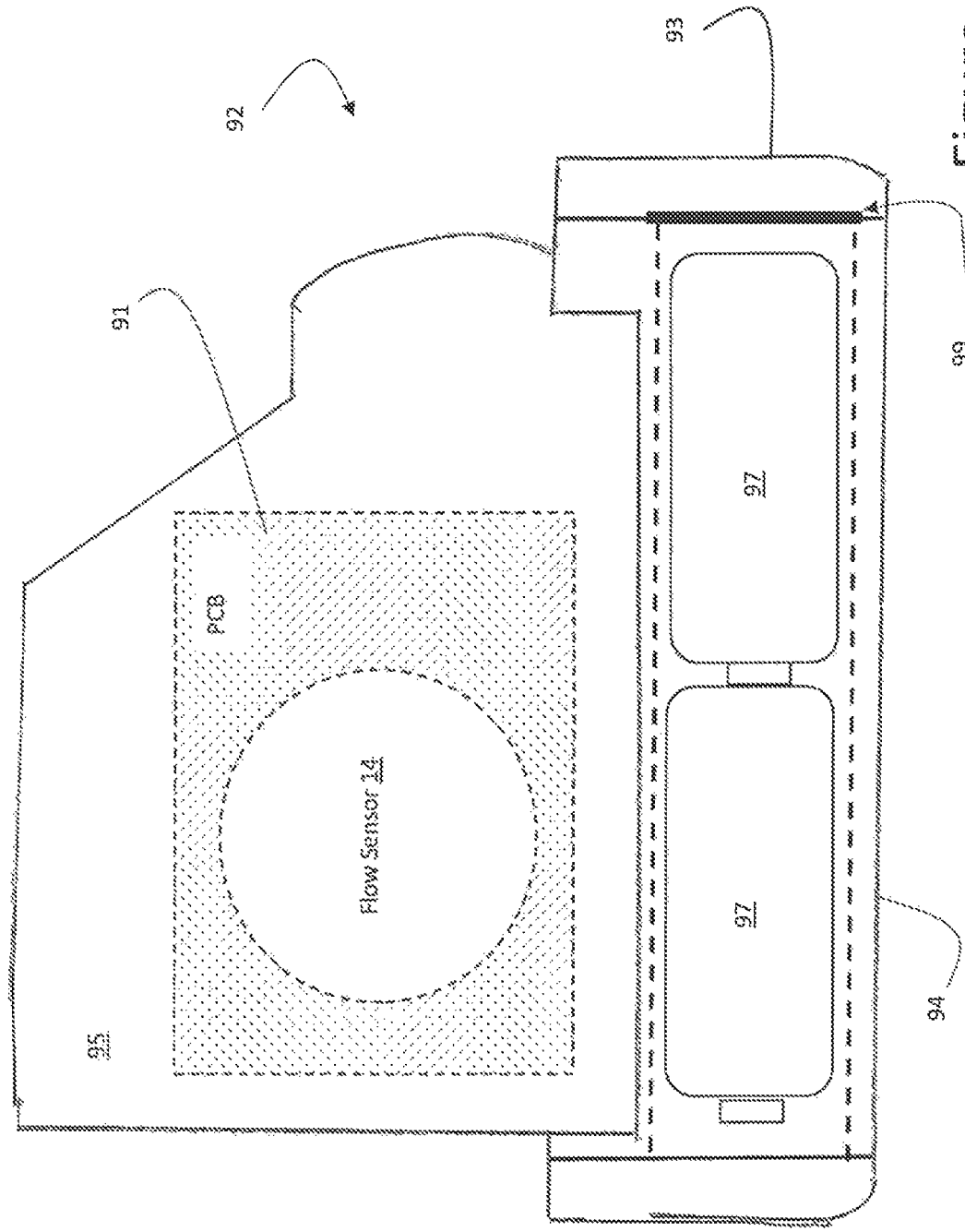

FLUID FLOW SENSOR SYSTEM FOR DETECTING FLOW EVENTS IN A TOILET

PRIORITY

This application claims priority to provisional patent application Ser. No. 62/287,493, entitled "Fluid Flow Measuring Systems and Methods" filed on Jan. 27, 2016, the contents of which are hereby incorporated by reference.

TECHNICAL FIELD

The subject matter of this invention relates to fluid flow sensing and measurement systems, and more particularly to an Internet of Things (IoT) based system for sensing and measuring water flow and leaks in household appliances such as toilets and the like.

BACKGROUND

As water resources become more scarce and expensive, water management in large facilities such as apartments, hotels, etc., will continue to become more and more important. Among the challenges facility owners and managers face is to ensure that water waste is minimized.

One area where water waste is commonplace involves leaking bathroom appliances such as toilets. A simple slow leak may go undetected for some time as the toilet will continue to operate, but will repeatedly discharge water as though it was partially flushed. More involved leaks could result in an overflow situation causing significant flood damage to the facility.

SUMMARY

Aspects of the disclosure provide an Internet of Things (IoT) based system for sensing and measuring water flow and detecting leaks in household appliances such as toilets.

A first aspect discloses a sensor system installable in a toilet tank, comprising: a housing that contains a power source and an event processing system; a water flow sensor that provides water flow data to the event processing system, the sensor having an inlet adapted to receive an inflow of water from a fill tube and an outlet that expels an outflow of water; a probe that activates the event processing system in response to a detected water flow event; and a support structure for seating the housing onto an overflow tube, wherein the support structure includes an assembly to receive the outflow of water and redirect the outflow into the overflow tube.

A second aspect discloses a water management system, comprising: a plurality of sensor systems, each configured to be installed in a respective toilet tank, and comprising: a housing that contains a power source and an event processing system; a water flow sensor that provides event data to the event processing system in response to a water flow between a fill tube and an overflow tube; and a support structure for seating the housing onto the overflow tube and for directing the water flow into the overflow tube; and a remote data processing system having: a communication interface for communicating with the event processing system of each of the plurality of sensor systems; and an analysis system for analyzing event data from each of the sensor systems to identify potential failures.

A third aspect discloses a sensor system for measuring water flow in a toilet tank, comprising: an event processing system; a water flow sensor that provides event data to the event processing system in response to a water flow between a fill tube and an overflow tube; and a support structure for seating the sensor system onto the overflow tube and for directing the water flow into the overflow tube.

BRIEF DESCRIPTION OF THE DRAWINGS

These and other features of this invention will be more readily understood from the following detailed description of the various aspects of the invention taken in conjunction with the accompanying drawings in which:

FIG. 6 depicts a top view of the alternative configuration of the sensor system according to embodiments.

Figure 1:
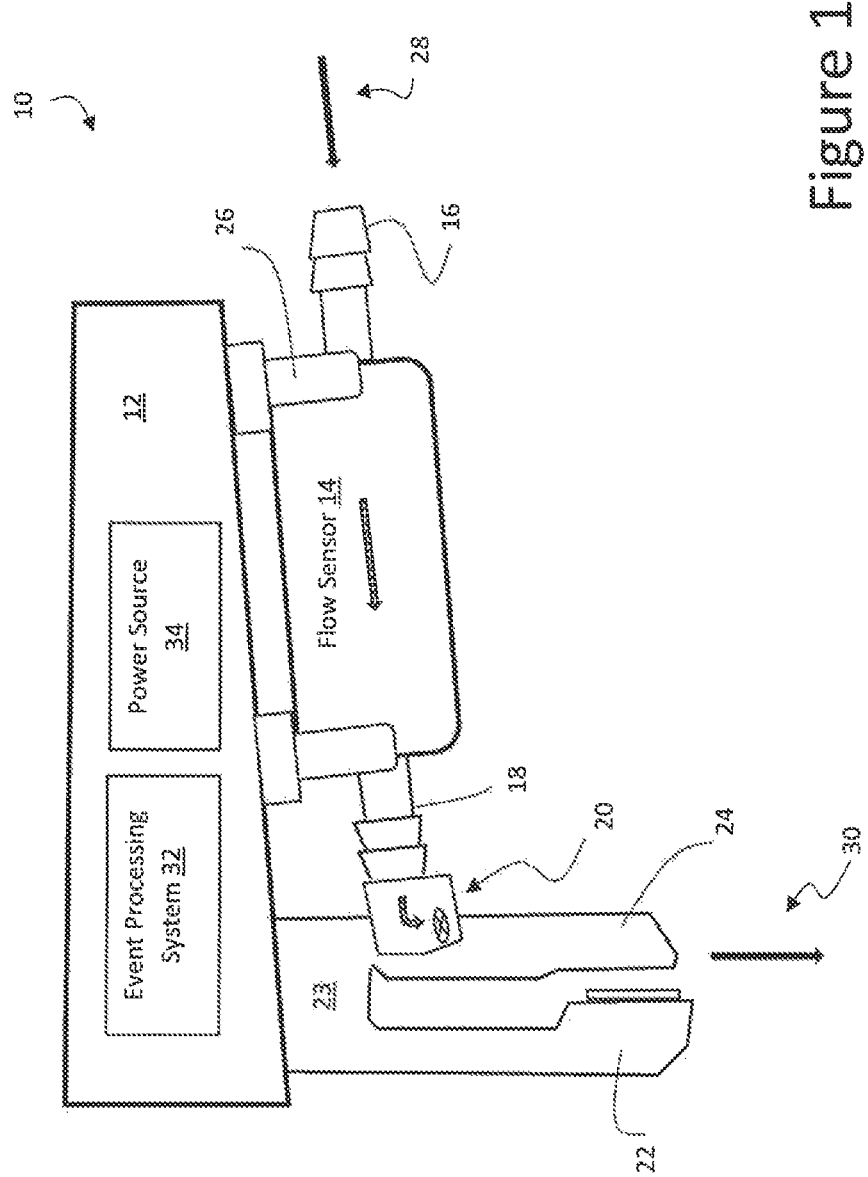
FIG. 1 shows a side view of a sensor system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Aspects of this disclosure include an Internet of Things (IoT) based system for sensing and measuring water flow and detecting leaks in household appliances such as toilets. In one embodiment, a sensor device is provided that fits into the tank of a toilet, measures water consumption, and communicates wirelessly with a remote data processing system that identifies leaks or other alert conditions.

Almost all conventional toilets utilize water that is stored in a tank and released when flushed. After each flush, a re-fill "event" occurs within the toilet that includes a flow of water through a flexible fill tube and into an overflow tube. If there is a leak or other performance issue with the toilet (e.g., a malfunctioning flapper), the toilet will flow more water than is necessary via the fill tube. The present invention provides a sensor system that measures water flow between the flexible fill tube and overflow tube in a conventional toilet. The system only activates when water is flowing through the fill tube, thus minimizing power usage of the system. Raw data corresponding to an amount of flow is captured by the system and wirelessly transmitted to a remote data processing system for analysis.

Referring now to the drawings, FIG. 1 depicts a sensor system 10 that will automatically detect and measure water flow in a toilet. Sensor system 10 generally includes: (1) a housing 12 that contains an event processing system 32 and an associated power source 34; (2) a water flow sensor 14 that measures water flow between an inlet 16 and outlet 18; (3) a probe 20 that detects a water flow event and activates that event processing system 32; and (3) a support structure 23 for mounting the sensor system 10 onto a toilet overflow tube (not shown) and discharging water flow therein.

Housing 12 may be fabricated from any material that can provide a water sealed environment for the event processing system 32 and power source 34. For example, housing 12 may be fabricated as a relatively solid block of plastic using an injection molding process, a 3D printing process, etc., that includes cavities for holding the event processing system 32 and power source 34, and which includes any water tight access doors or panels. Water sealing may be achieved in any known manner, e.g., sealing with an epoxy resin, utilizing gaskets, etc. Event processing system 32 is described in further detail with respect to FIG. 3, but may typically comprise a circuit board or the like, and is functionally coupled (e.g., via wires) to the probe 20, water flow sensor 14, and power source 34. Water flow sensor 24 may be physically attached to the housing 12 with a coupling 26. Power source 34 may comprise a battery or any other now known or later developed energy storage device (e.g., a spring based system, a pressure based system, etc.).

Water flow sensor 14 may for example comprise a Hall Effect sensor having an internal turbine or the like that rotates in response to a flow of water and emits signals based on the flow-rate. Event processing system 32 is configured to capture a contiguous set of water flow values at predefined time intervals during the water flow event. For example, event processing system 32 may capture a signal count value every 2 seconds. The result is a set of event data consisting of a series of flow-rate values for a given flow event. Once collected, the event data is packaged and wirelessly transmitted to a remote data processing system for analysis. Transmission may occur at the time of the event, or any time thereafter.

In the depicted configuration, inputted water flow 28 enters the water flow sensor 14 via inlet 16 and exits via outlet 18. Upon exiting, the water flow enters an assembly that includes one or more probe(s) 20 and redirects the flow downward within support structure 23, where the outputted water flow 30 empties into an overflow tube. Probe 20 detects a flow of water (i.e., a flow event) and sends a signal to "activate" (i.e., turn on or wake up) event processing system 32. Probe 20 may for example comprise a switch in which a water droplet acts a conductor to complete the connection. The probe 20 may therefore utilize a small amount of power from the power source 34. In one illustrative embodiment, probe 20 is located at the bottom of a "c cup" assembly that is positioned to allow the passing water to most effectively contact the probe 20. The c cup ensures that the water is redirected downward toward the probe 20 prior to exiting through the support structure 23.

Figure 2:
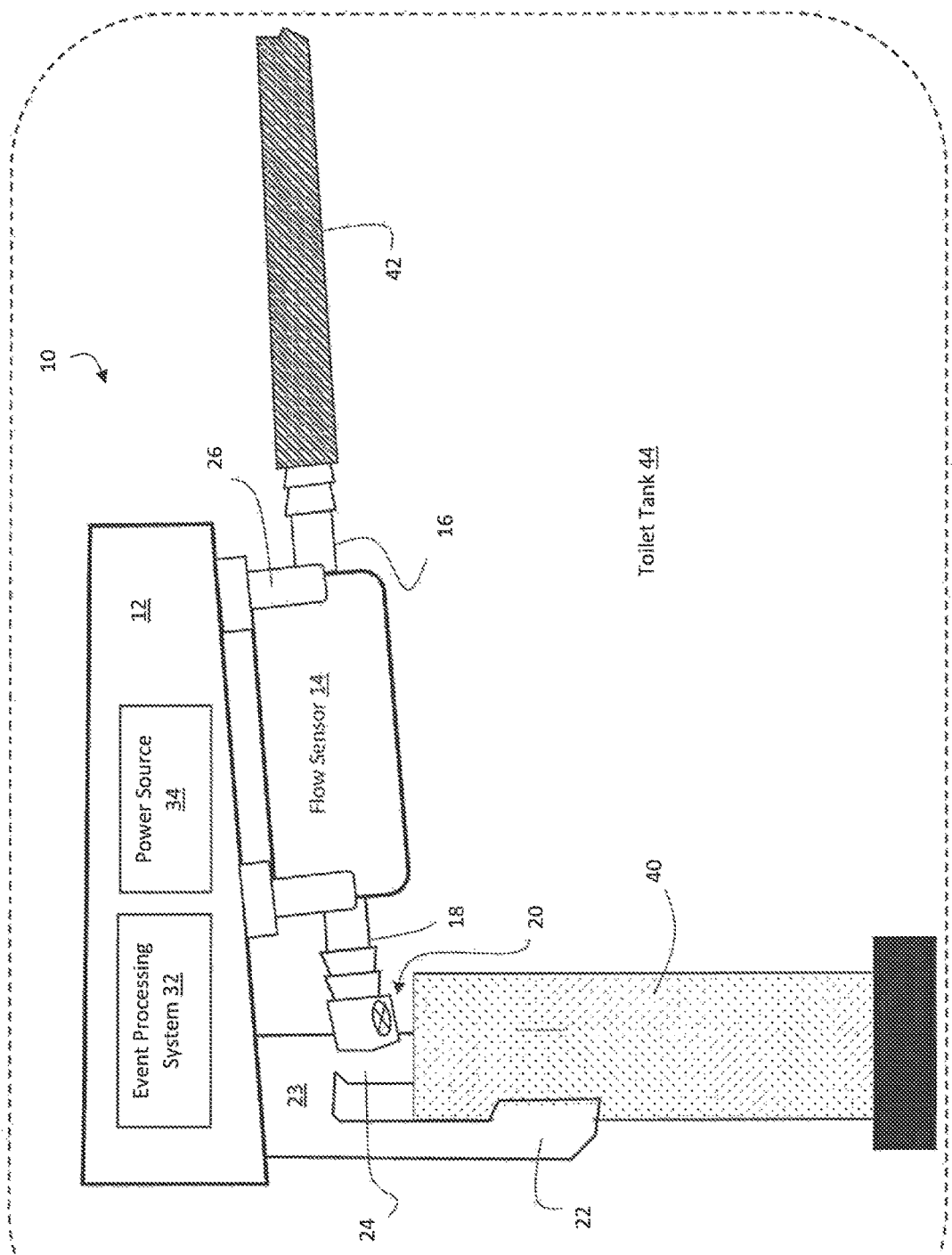
FIG. 2 shows the sensor system of FIG. 1 installed in a toilet according to embodiments.

Support structure 23 includes an external leg 22 adapted to sit on an outside surface of the overflow tube and an internal leg 24 adapted to sit on an adjacent internal surface of the overflow tube when installed. FIG. 2 depicts the sensor system 20 installed onto an existing toilet overflow tube 40 in a toilet tank 44. As shown, external leg 22 of support structure 23 is seated on the outer surface of overflow tube 40 and internal leg 24 (shown in part) is seated on an adjacent inner surface of overflow tube 40. The external leg 22 and internal leg 24 essentially fasten or clamp onto the existing toilet overflow tube 40, thus holding sensor system 10 in place while also guiding the flow of water downward into the overflow tube 40. Also shown is the flexible fill tube 42 that flows water from the existing toilet valve (not shown) into the sensor system 10.

In a traditional toilet (i.e., prior to installation of sensor system 10), fill tube 42 is simply fasted onto, and releases water into, overflow tube 40. Thus, sensor system 10 is easily installed into any traditional toilet that utilizes a fill tube 42 and overflow tube 40. The installer need only (1) remove the fill tube 42 from the overflow tube 40, (2) seat the sensor system 10 onto the overflow tube 40, and (3) plug the fill tube 42 into the inlet 16 of the sensor system 10. Additional calibration steps may be implemented to capture the particular characteristics of the toilet (e.g., a toilet signature may be captured by flushing the toilet one or more time to determine how much/long water flows during a typical flush). In an alternative approach, sensor system 10 may be integrated into the toilet when assembled.

Note that in this embodiment, housing 12 is tapered to minimize the use of available space within a typical tank. It is however understood that any configuration that incorporates the described features may be utilized.

Figure 3:
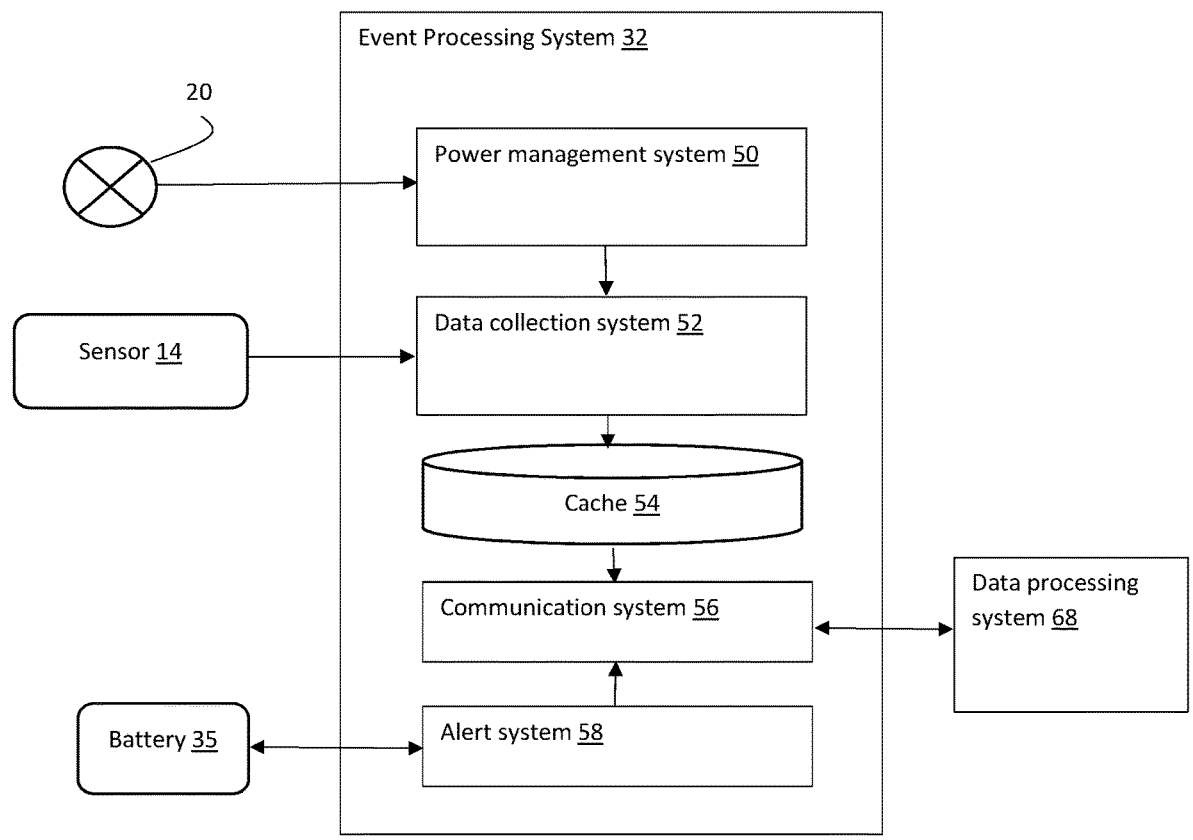
FIG. 3 shows an event processing system according to embodiments.

FIG. 3 depicts a block diagram of an illustrative event processing system 32. In one embodiment, event processing system 32 operates within an Internet-of-Things (IoT) platform, along with a larger set of event processing systems, e.g., installed in other toilets and appliances. In this illustrative approach, the IoT platform may be implemented using any protocol, such as 6LoWPAN (IPv6 over Low power Wireless Personal Area Networks).

Event processing system 32 may be implemented with a circuit board that includes special purpose hardware and/or a combination of hardware and software. Components include a power management system 50 that activates the event processing system 32 in response to a probe 20 signal, indicating that a flow event is occurring. Once activated, a data collection system 52 begins collecting event data from sensor 14 and may for example store chunks of data in a cache 54. In one illustrative approach, data collection system 52 stores chunks consisting of one minute of data in which each one-minute chunk includes 30 data points made up of count or flow-rate values recorded every two seconds.

Once collected, communication system 56 sends the event data to a remote data processing system 68 for analysis. Event data may be sent at the time a given flow event occurs, or at some time thereafter (e.g., daily at a predetermined time). Any wireless communication protocol may be utilized. Furthermore, communications can be implemented in any manner, e.g., client-server, pier-to-pier, machine-to-machine, smart-grid, etc.

In addition, an alert system 58 may be implemented to periodically test the battery 35 and other aspects of the sensor system 10 and report any system failures or warnings to the remote data processing system 68.

Figure 4:
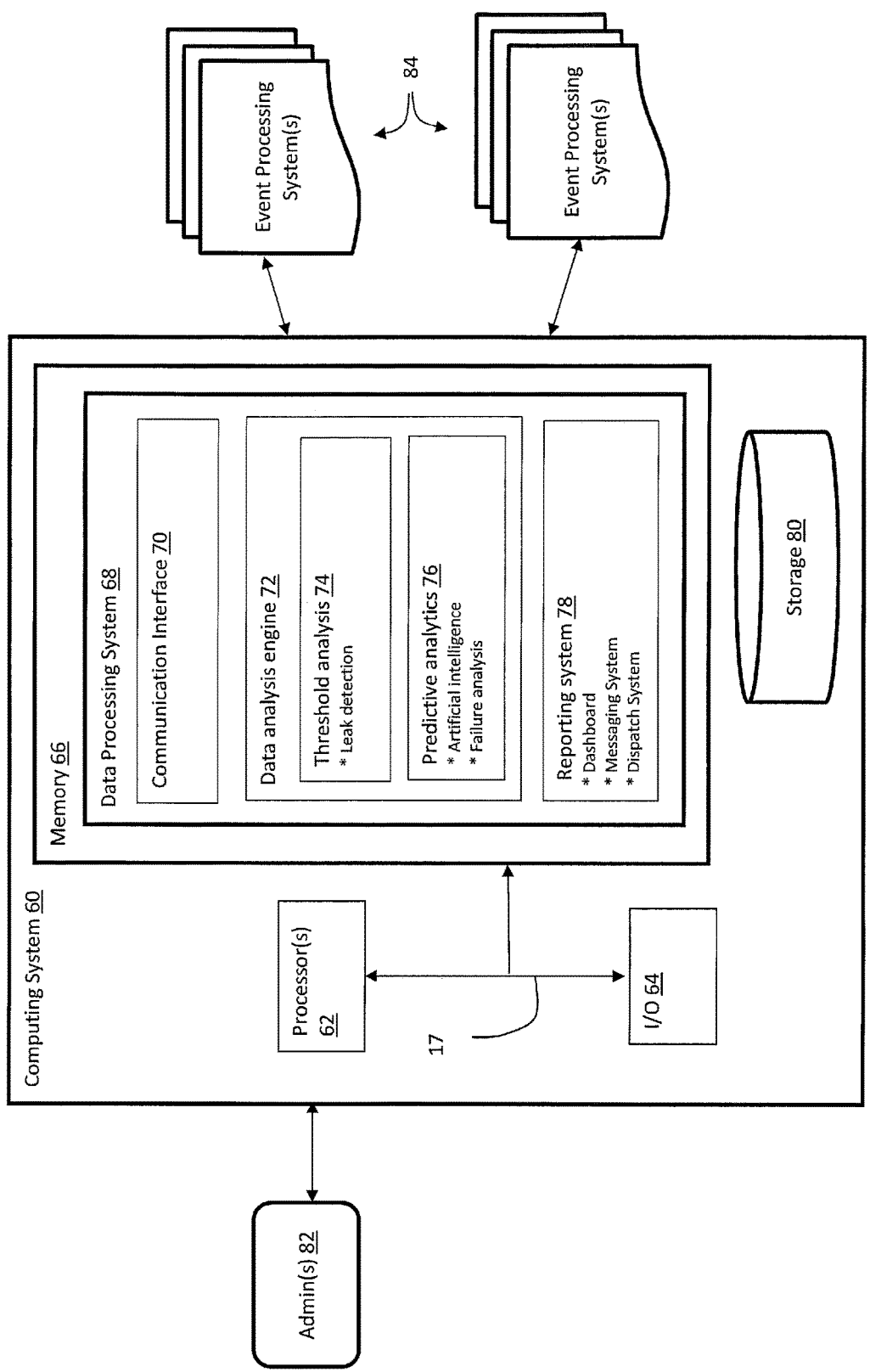
FIG. 4 shows a data processing center according to embodiments.

FIG. 4 depicts a water management system that may implemented as an IoT platform, which includes a computing system 60 networked with a group of event processing systems 84. Computing system 60 includes a data processing system 68 that collects and analyzes event data from one or more sets of event processing systems 84, e.g., from a set of toilets in a hotel, from a set of toilets in an apartment building, etc. Data processing system 68 generally includes: a communication interface 70 for receiving event data from event processing systems 84, and for storing event data in storage 80; a data analysis engine 72 that analyzes event data to identify leaks and perform predictive analytics; and a reporting system 78 that, e.g., outputs leak detections to an administrator 82 or other entities (e.g., apartment owners, building managers, etc.).

Data analysis engine 72 may for example utilize threshold analysis 74 that compares data for each flow event to a predetermined threshold or signature. For example, a typical flush for a particular toilet may be expected to result in a flow event that lasts between 50-70 seconds. A flow event that falls outside the expected range is reported as potential leak or failure situation.

In addition, predictive analytics 76 may be implemented to analyze larger sets of data in storage 80, using artificial intelligence or the like to identify system wide patterns. For example, machine learning may be employed to cluster flow event signatures, toilet models, repair histories, failures, locations, etc., and assign statistical failure probabilities. For example, it may be determined that a given apartment building experiences a serious toilet flood event every six months. Predictive analytics 76 may be utilized to identify toilets that have a statistically higher probability of failure. Preventative maintenance may then be dispatched in an effort to avoid costly damage.

Reporting system 78 may for example include a dashboard that allows an administrator 82 or the like to view historical failure data, water usage data, predictive analytics, currently reported issues, etc. Reporting system 78 may also include a messaging system that sends email or text message alerts when a problem is detected. Reporting system 78 may also include a dispatch system that automatically identifies and dispatches a service provider (e.g., plumber, maintenance worker, insurance providers, etc.) when a failure condition is detected.

Figure 5:
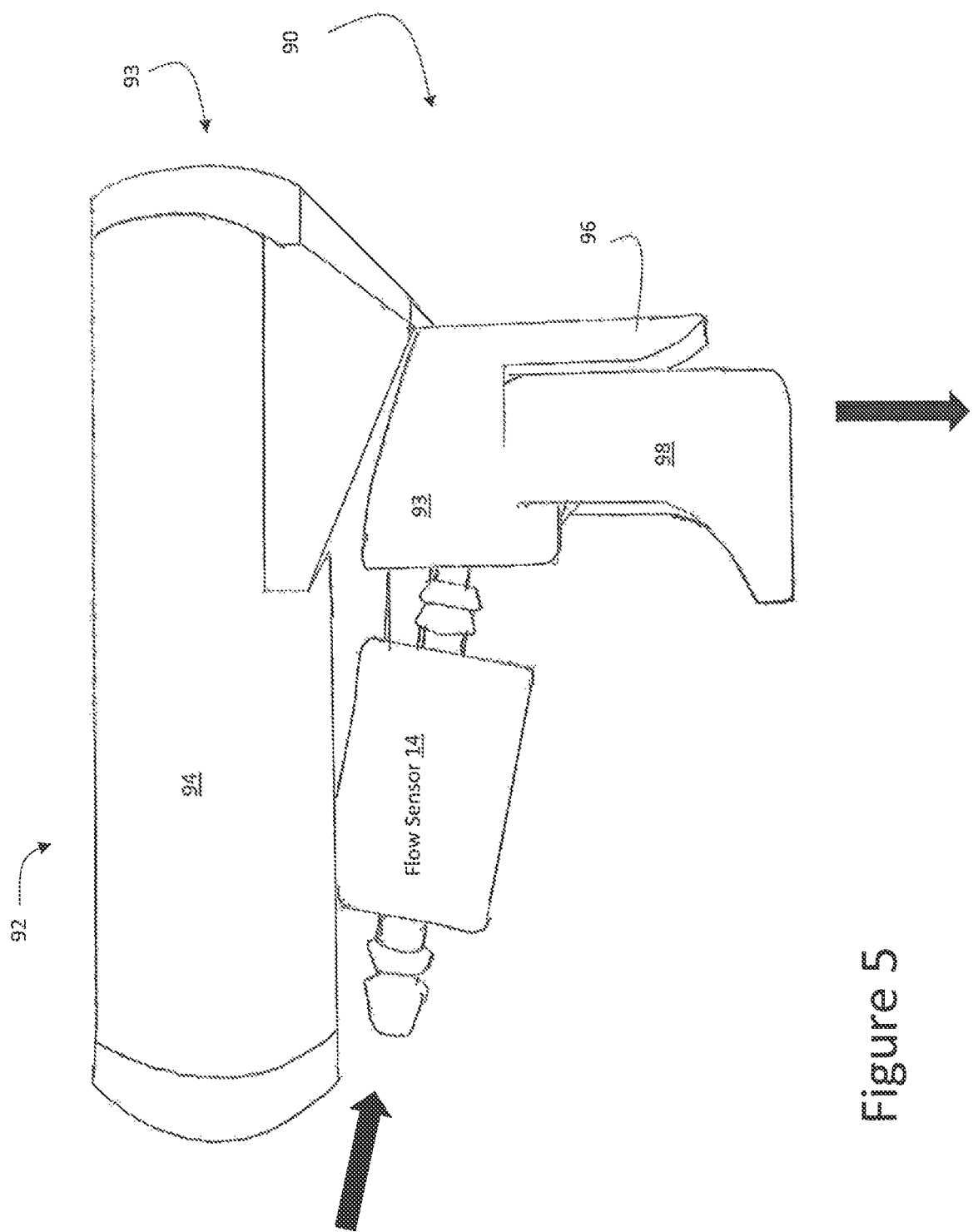
FIG. 5 depicts a side view of an alternative configuration of the sensor system according to embodiments.

FIGS. 5 and 6 depict a side view and top view, respectively, of an alternative configuration of a sensor system 90. Sensor system 90 operates essentially the same as that shown in FIGS. 1 and 2. In this embodiment, housing 92 includes a generally (or partially) cylindrical section 94 for holding a battery, and a flat wing section 96 (FIG. 6) for holding a circuit board 91. Cylindrical section 94 may include an endcap 93 that can be removed with a screw or the like to load one or more standard tubular shaped batteries 97, and include an internal gasket 99 for ensuring a water tight seal once secured.

As shown in FIG. 5, support structure 96 likewise includes a first leg 98 that sits inside a traditional overflow tube (not shown) and a second leg 96 that sits outside the traditional overflow tube. In addition, first leg 98 is configured with a semicircular profile to attach directly on top of narrower style overflow tubes (without requiring the second leg 96).

As noted, a printed circuit board 91 (shown in phantom in FIG. 6) is utilized to provide the event processing system, and is encapsulated in flat wing section 95. The water flow sensor 14 (also shown in phantom in FIG. 6) is located directly below the board 91 so that wiring during the assembly is minimized. In this configuration, water flow sensor 14 is directly over the flow sensor housing.

Only the battery leads and water sensing probe 20 leads need to be connected during assembly. The battery leads are soldered and the probe leads are connected on a terminal block. A programming and provisioning header may be utilized that minimally protrudes from the housing cover, this allowing the housing to be permanently sealed shut, while maintaining field programming and provisioning capabilities.

It is understood that data processing system 68 (FIG. 3) may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 60 that may comprise any type of computing device and for example includes at least one processor 62, memory 66, an input/output (I/O) 64 (e.g., one or more I/O interfaces and/or devices), and a communications pathway 17. In general, processor(s) 62 execute program code which is at least partially fixed in memory 66. While executing program code, processor(s) 62 can process data, which can result in reading and/or writing transformed data from/to memory and/or I/O 64 for further processing. The pathway 17 provides a communications link between each of the components in computing system 60. I/O 64 can comprise one or more human I/O devices, which enable a user to interact with computing system 60. Computing system 60 may also be implemented in a distributed manner such that different components reside in different physical locations.

Furthermore, it is understood that the data processing system 68 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A sensor system installable in a toilet tank, comprising:
 a housing that contains a power source and an event processing system;
 a water flow sensor mounted to an underside of the housing that provides water flow data to the event processing system, the sensor having an inlet adapted to receive an inflow of water from a fill tube and an outlet that expels an outflow of water;
 a switch situated downstream from the water flow sensor that activates the event processing system in response to water expelled from the outlet of the water flow sensor completing a conductive connection, wherein activation of the event processing system triggers a water flow event during which water flow data is collected from the water flow sensor upstream from the switch; and
 a support structure for seating the housing onto an overflow tube, wherein the switch is integrated into the support structure and the support structure includes an assembly to receive the outflow of water and redirect the outflow into the overflow tube.

2. The sensor system of claim 1, wherein the event processing system includes a communication system for communicating water flow data to a remote data processing system.

3. The sensor system of claim 1, wherein the event processing system captures a contiguous set of water flow values at predefined time intervals during the water flow event.

4. The sensor system of claim 1, wherein the power source comprises a battery.

5. The sensor system of claim 1, wherein the housing comprises a water sealed enclosure for the event processing system and the power source.

6. The sensor system of claim 1, wherein the sensor comprises a Hall Effect sensor that generates signals corresponding to a water flow rate.

7. The sensor system of claim 1, wherein the support structure comprises a first section adapted to sit on an external surface of the overflow tube and a second section adapted to sit on an adjacent internal surface of the overflow tube.

8. A water management system, comprising:
 a plurality of sensor systems, each configured to be installed in a respective toilet tank, and comprising:
 a housing that contains a power source and an event processing system;

a water flow sensor mounted beneath the housing that provides event data to the event processing system in response to a water flow between a fill tube and an overflow tube;

a switch situated downstream from the water flow sensor that activates the event processing system in response to water expelled from the water flow sensor completing a conductive connection, wherein activation of the event processing system triggers a water flow event during which water flow data is collected from the water flow sensor upstream from the switch; and a support structure for seating the housing onto the overflow tube and for directing the water flow into the overflow tube, wherein the switch is integrated into the support structure; and a remote data processing system having:

a communication interface for communicating with the event processing system of each of the plurality of sensor systems; and an analysis system for analyzing event data from each of the sensor systems to identify potential failures.

9. The water management system of claim 8, wherein the switch includes a probe in which a water droplet acts as a conductor.

10. The water management system of claim 8, wherein in the data processing system includes a reporting system.

11. The water management system of claim 8, wherein the power source comprises a battery.

12. The water management system of claim 8, wherein event processing system is contained in a water sealed housing.

13. The water management system of claim 8, wherein the water flow sensor comprises a Hall Effect sensor that generates signals corresponding to a water flow rate.

14. The water management system of claim 8, wherein the support structure comprises a first section adapted to sit on an external surface of the overflow tube and a second section adapted to sit on an adjacent internal surface of the overflow tube.

15. A sensor system for measuring water flow in a toilet tank, comprising:

an event processing system;

a water flow sensor that provides event data to the event processing system in response to a water flow between a fill tube and an overflow tube;

a switch situated downstream from the water flow sensor that activates the event processing system in response to water expelled from the water flow sensor completing a conductive connection, wherein activation of the event processing system triggers a water flow event during which water flow data is collected from the water flow sensor upstream from the switch; and a support structure for seating the sensor system onto the overflow tube and for directing the water flow into the overflow tube, wherein the switch is integrated into the support structure.

16. The sensor system of claim 15, wherein the power source comprises a battery.

17. The sensor system of claim 15, wherein the event processing system is contained in a water sealed housing.

18. The sensor system of claim 15, wherein the water flow sensor comprises a Hall Effect sensor that generates signals corresponding to a water flow rate.

19. The sensor system of claim 15, wherein the support structure comprises a first section adapted to sit on an external surface of the overflow tube and a second section adapted to sit on an adjacent internal surface of the overflow tube.

20. The sensor system of claim 15, wherein the switch includes a probe in which a water droplet acts as a conductor.

* * * * *